United States Patent [19]

Liedle

[11] Patent Number: 4,712,762
[45] Date of Patent: Dec. 15, 1987

[54] ADJUSTABLE REUSABLE ADAPTER SYSTEM FOR TEMPORARY ELECTRIC SERVICE

[76] Inventor: William O. Liedle, 2809 E. 27th St., Vancouver, Wash. 98661

[21] Appl. No.: 896,838

[22] Filed: Aug. 14, 1986

[51] Int. Cl.$^4$ .......................................... F16M 13/00
[52] U.S. Cl. ................................... 248/533; 248/545; 248/170; 248/156
[58] Field of Search ............... 248/533, 545, 156, 579, 248/528, 529, 532, 530, 237, 170, 171, 434, 165, 507, 508, 536, 534, 539, 166; 52/169.13, 156; 135/118

[56] References Cited

U.S. PATENT DOCUMENTS

| | | | |
|---|---|---|---|
| 996,524 | 6/1911 | Raudabaugh | 248/166 |
| 1,144,726 | 6/1915 | Robinson | 248/165 |
| 1,235,388 | 7/1917 | Sherwood | 248/170 |
| 2,416,848 | 3/1947 | Rothery | 248/170 |
| 2,835,262 | 5/1958 | Collins | 135/118 |
| 4,103,853 | 8/1978 | Bannan | 248/230 |

FOREIGN PATENT DOCUMENTS 2396143  3/1979  France .................................. 52/165

Primary Examiner—Reinaldo P. Machado
Assistant Examiner—A. Chin-Shue
Attorney, Agent, or Firm—Marger & Johnson

[57] ABSTRACT

The present invention is directed to an adjustable adapter system capable of supporting and maintaining a temporary electrical service above ground level at a building site prior to installation of permanent electrical services. The adjustable adapter system is employed in conjunction with respective vertical and bracing support members for maintaining and supporting the vertical member in a uniform, stable, substantially vertical position regardless of the contour of the underlying terrain. The subject system comprises a bracket support means which is easily connected to and adjustably movable along a vertical support member secured to the ground. The bracket support means is movable in an upward and downward substantially vertical direction to a desired position along the vertical support member for maintaining and supporting the vertical member in a uniform, stable, substantially vertical position regardless of the contour of the underlying terrain.

12 Claims, 3 Drawing Figures

U.S. Patent   Dec. 15, 1987   Sheet 1 of 1   4,712,762
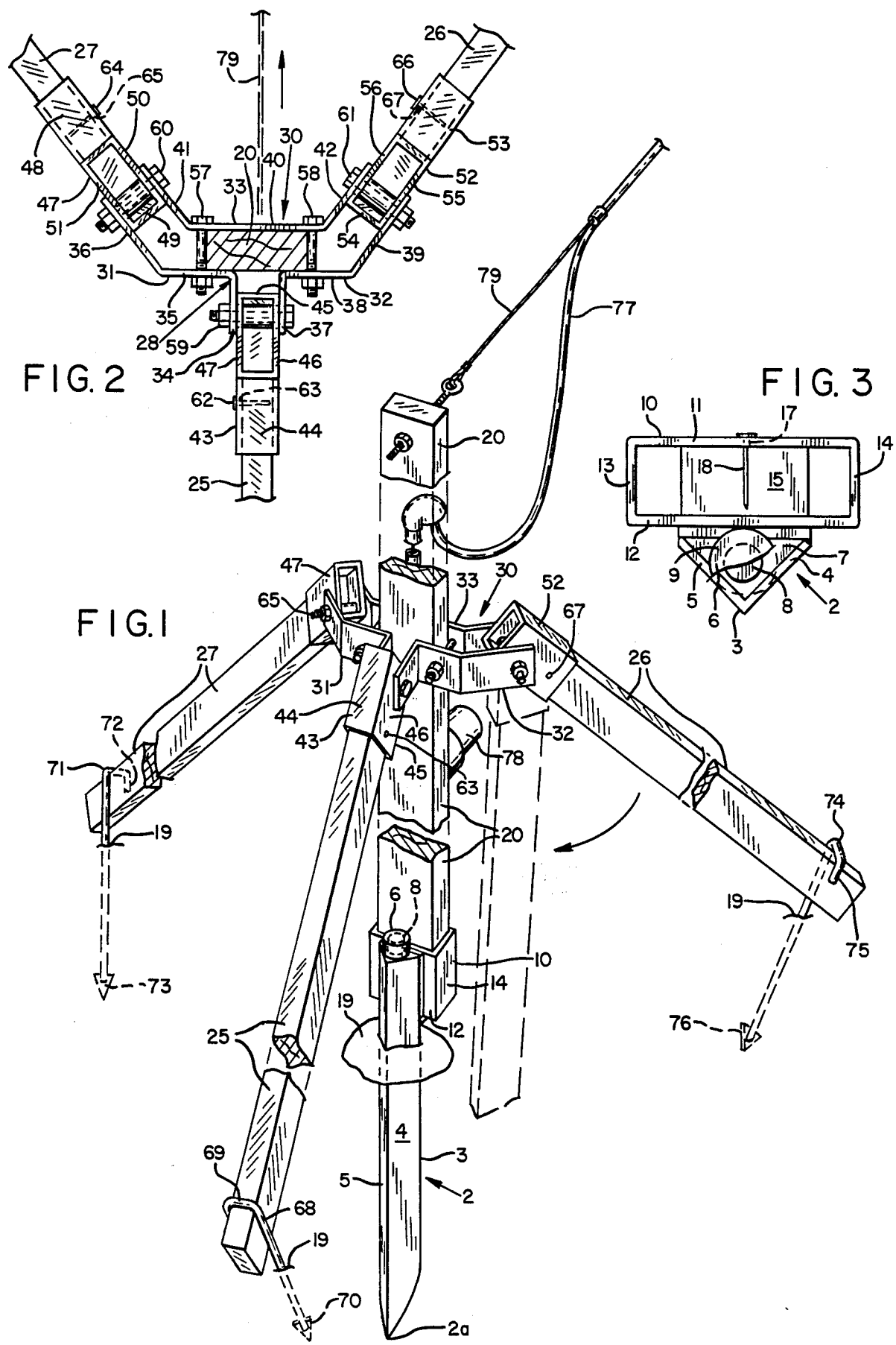

ADJUSTABLE REUSABLE ADAPTER SYSTEM FOR TEMPORARY ELECTRIC SERVICE

BACKGROUND OF THE INVENTION

1. Field of the Invention

This invention relates to an adjustable reusable adapter system for maintaining a temporary electric service in place above ground level at a building site prior to the installation of permanent electric service.

2. Description of the Prior Art

In the building industry providing temporary electric service, prior to permanent electric service installation, is typically done on a makeshift basis by fastening together a series of wooden boards, propping up the makeshift service, and then attaching the service line and electrical meter thereto. This process must be repeated each time temporary service is to be assembled at a construction site. Furthermore, there is no uniformity in the construction of temporary service system so that industry standards are nonexistent.

More specifically, the typical assembly process is initiated by first digging a hole in the ground and then placing a post therein. The hole is then filled with dirt and compacted to provide vertical stability for the post. Three boards are attached to the upper end of the post and are then secured to the ground at their lower ends by wooden stakes.

It is difficult at best for a single workman to maintain and position all of the component boards while the assembly operation is being effected. There is also often a great deal of time and energy wasted in disassembling the makeshift temporary electrical service.

Digging a hole at each installation is totally inefficient. Once in the ground, the post is subject to rotting, especially in wet weather.

Another problem involves maintaining the completed service assembly in a stable vertical position if the contour of the underlying terrain is undulating or at all sloped in nature.

Finally, such a makeshift device has limited reusability. Many times it must be discarded after a single use.

Accordingly, there is a need for a better way to provide temporary electrical service at a building site.

SUMMARY OF THE INVENTION

The present invention is directed to an adjustable adapter system capable of supporting and maintaining a temporary electrical service above ground level at a building site prior to installation of permanent electrical services.

The adjustable adapter system is employed in conjunction with respective vertical and bracing support members for maintaining and supporting the vertical member in a uniform, stable, substantially vertical position regardless of the contour of the underlying terrain. The adjustable adapter system of the present invention is readily assembled and diassembled by a single workman. It can also be easily secured into the ground by a single workman.

The subject system comprises a bracket support means which is easily connected to and adjustably movable along a vertical support member secured to the ground. The bracket support means is movable in an upward and downward substantially vertical direction to a desired position along the vertical support member for maintaining and supporting the vertical member in a uniform, stable, substantially vertical position regardless of the contour of the underlying terrain.

The bracket support means further includes a plurality of spaced-apart sleeve means, pivotally attached to the vertical support member for adjustable movement in an angular arcuate path toward or away from the vertical support member. A plurality of bracing support members are then connected to the sleeve means. The respective sleeve means and bracing support members together are adjustably movable by a single workman to a plurality of desired angular positions with respect to the vertical support member. This provides a further means for maintaining and supporting the vertical support member in a substantially vertical position regardless of the contour of the underlying terrain.

The base support means of this invention can desirably be employed to support and maintain a vertical support member in a fixed, substantially vertical position. The base support means can be readily secured into the ground without digging a hole. The vertical support member is then mounted in a substantially vertical position therewith. The base support means is fabricated from a material other than wood in order to avoid the rotting problem.

Once assembled, a single workman can, without difficulty, disassemble the adjustable adapter system and store same for reuse at a later time.

This system could be an industry standard since it satisfies all requisites for maintaining and supporting a temporary electrical service at most any construction site.

The foregoing and other objects, features and advantages of this invention will become more readily apparent form the following detailed description of a preferred embodiment which proceeds with reference to the accompanying drawings.

BRIEF DESCRIPTION OF THE DRAWINGS

FIG. 1 is an enlarged, fragmentary, perspective view of the adjustable adapter system of the present invention.

FIG. 2 is a plan view of the system depicted in FIG. 2.

FIG. 3 is an enlarged, plan view of stake means in FIG. 2.

DETAILED DESCRIPTION OF THE PREFERRED EMBODIMENT

Referring now to FIGS. 1 and 2, an adjustable adapter system 1 is provided for use in conjunction with a vertical bracing support member 20 and a plurality of bracing support means 25-27, respectively, for maintaining a temporary electric service place above ground level at a building site prior to the installation of permanent electrical service.

Vertical support member 20 is first secured into the underlying terrain 19. Bracket support means 30 connected to vertical support member 20 and are slidable along support member 20 in an upward and downward substantially vertical direction. It can be secured in a plurality of fixed positions for maintaining and supporting vertical support member 20 in a uniform, stable, and substantially vertical position, regardless of the slope of the underlying terrain 19.

Bracket support means 30 further includes a plurality of spaced-apart sleeve means, in this instance sleeve means 43, 47, and 52, respectively, each of the above sleeve means being pivotally attached at one end to vertical support member 20 for adjustable movement in an angular arcuate path toward or away from support member 20. In order to facilitate the supporting and maintaining of vertical support member 20, the sleeve means are preferably spaced apart at a substantially equal distance one from the other.

Sleeve means 43, 47, and 52 each have mounted within their other ends bracing support members 25, 26, and 27. The respective sleeve means 43, 47 and 52 and associated bracing support members 25–27 are together adjustably movable to a desired angular position with respect to vertical support member 20, for further maintaining the vertical member 20 in a staple vertical position in spite of the slope of the underlying terrain.

Bracket support means 30 preferably includes front bracket angle means 31 and 32 and rear bracket angle means 33. The bracket angle means 31–33 together form a bracket angle assembly 28. The bracket angle assembly 28 is interconnected to vertical support member 20 for slidable upward and downward vertical movement, and for pivotal connection to one end of spaced-apart sleeve means 43, 47 and 52.

Referring more specifically to FIG. 2, front bracket angle means 31 comprises forwardly-extending section 34 and sidewardly-extending section 35, preferably disposed at substantially right angles one with respect to the other, and a rearwardly-extending section 36, preferably disposed at an obtuse angle with respect to section 35. Similarly, front bracket angle means 32, which is substantially a mirror-image of front bracket angle means 31, includes respectively forwardly-, sidewardly-, and rearwardly-extending sections 37–39. Rear bracket angle means 33 comprises a sidewardly-extending section 40 connected at its respective ends to a pair of rearwardly-extending sections 41 and 42, respectively. Sections 41 and 42 are preferably disposed at an obtuse angle with respect to section 40. The bracket angle assembly 28 is held in place by fastening assembly means, such as bolt 57, which passes through, and interlockingly secures, respective bracket angle means 31 and 33, and fastening assembly means, such as bolt 58, which passes through, and interlockingly secures, respective bracket angle means 32 and 33. Fastening assembly means 57 and 58 interlockingly connect bracket angle assembly means 28 and vertical support member 20 so that after bracket support means 30 is adjustably moved in an upward and downward vertical direction along vertical support member 20 to a desired vertical height, it can be disposed in a fixed position by tightening fastening assembly means 57 and 58.

Sleeve means 43, 47, and 52, in the form of rectangular tubular members, comprise respective front wall sections 44, 48, and 53, rear wall sections 45, 49, and 54, and sidewall sections 46, 46a, 50, 51, 55, and 56 joined together one to the other. The above-described wall sections form a substantially rectangular cross-sectional open area within the confines of the respective sleeve means. Sleeve means 43, 47, and 52 are pivotally connected to bracket angle assembly means 28 by respective fastening assembly means, or bolts 59–61. Bracing support means 25–27 are held in position within sleeve means 43, 47 and 52 by respective fastening means, or pins 62, 64, and 66, passing through openings 63, 65 and 67.

In order to hold the lower ends of bracing support members 25–27 in contact with the underlying terrain, retainer means 68, 71, and 74, respectively, interlockingly engage the lower ends of these bracing support members. More specifically, retainer means 68, 71, and 74 each comprise a hooked section 69, 72, and 75, respectively, which engage the lower ends of each of respective bracing support members 25–27, and which are securely held in place in the underlying terrain by respective pointed end sections 70, 73, and 76.

The preferred means for securing vertical support member 20 into the ground in a fixed substantially vertical position is by employing base support means 2. As specifically depicted in FIGS. 1 and 3, base support means 2 comprises stake means 3, which preferably includes V-shaped sections 4 and 5 joined one to the other lengthwise to form a V-shaped angle member. A pointed lower end 2a is provided to assist in driving of base support means 2 into the ground. A pocket means 10 is joined to the upper end of stake means 3 for mounting vertical support member 20 within base support means 2. Pocket means 10 comprises a front wall section 11, a back wall section 12, sidewall sections 13 and 14, and horizontal floor section 15, all of which are joined one to the other. The above-described wall sections form a substantially rectangular cross-sectional open inner area within the confines of pocket means 10. Vertical support means 20 is held in place within pocket means 10 by fastening means, such as nail 18, passing through opening 17 in front wall section 11. A striker means 6 is provided at the top of stake means 3 for use in driving the base support means 2 into the ground. Striker means 6 comprises a striker element means 8 joined to retainer plate 7 at the top of stake means 3. A striker protective cap means 9 is included to cushion the impact imparted by various devices employed to drive base support means 2 into the underlying terrain. If the striker protective cap means 9 becomes damaged, it can be replaced without having to replace the striker element means 8, thereby increasing the longevity of base support means 2.

As depicted in FIG. 1, a temporary electrical service is maintained in place above ground level at a building site prior to installation of permanent electrical service by assembling an adjustable, reusable adapter system.

The system 1 can be so maintained because of its unique ability to be independently vertically and angularly adjusted for secure positioning on a plurality of underlying terrains. Generally, the relative vertical height of bracket support means 30 is adjusted by sliding bracket angle assembly 28. Each of the bracing support means 25–27 are also independently movable to a plurality of differing angular positions. In any case, the vertical height and angular positioning of the adapter system 1 of the present invention is adjustable so that the lower ends of bracing support members 25–27 are maintained in secure engagement with the underlying terrain regardless of its contour.

Adjustable adapter system 1 operates, as follows: First, vertical support member 20 is secured into surrounding terrain 19 for maintaining and supporting support member 20 in a fixed, substantially vertical position. Preferably, the above operation is facilitated by securing base support means into the underlying terrain 19 by driving stake means 3 therein by impacting striker means 6 with a hammer or like device. Vertical support member 20 is then positioned within pocket means 10 and is secured by driving fastening means 18 through opening 17 into support member 20. Bracket support means 30 is then connected to vertical support member 20. In this exemplary case, bracket angle assembly 28 is clamped onto vertical support member 20 by fastening assembly means 57, 58. Bracing support members 25-27 are then mounted within respective spaced-apart sleeve means 43, 47 and 51, and held in position therewithin by engaging respective fastening 63, 65 and 67. By loosening bolts 57 and 58, bracket support means 30 can then be adjustably moved to a desired position along vertical support member 20, in an upward or downward vertical direction, to a desired vertical height. Fastening assembly means 57 and 58 are then tightened to fix bracket support means 30 at the desired vertical height. Concurrently with the above-described vertical adjustment, bracing support means 25-27 can also be pivoted to a desired angular position with respect to vertical support member 20 to accommodate any unevenness in the underlying terrain 19. Respective fastening assembly means 59-61 are then tightened to fix bracing support means 25-27 at the desired angular position.

Having illustrated and described the principles of my invention in a preferred embodiment, it should be apparent that the invention may be modified in arrangement and detail without departing from such principles. I claim all modifications with the spirit and scope of the following claims.

I claim:

1. An adjustable, reusable adapter system for maintaining a temporary electrical service in position above ground level at a building site prior to the installation of permanent electrical service, which comprises:
   a. a vertical support member;
   b. a base support means connected to a lower end of the vertical support member and including a stake means for securing said vertical support member into the underlying terrain;
   c. bracket support means including a bracket angle assembly comprising a pair of front bracket angle means and a rear bracket angle means enclosing said vertical support means for clamping onto said vertical support member and adjustably movable in an upward and downward substantially vertical direction to a plurality of fixed positions and to a desired vertical position, along said vertical support member, for maintaining said vertical support member in a stable substantially vertical position regardless of the contour of the underlying terrain, and further including a plurality of sleeve means, having a substantially rectangular cross-sectional configuration, and spaced angularly apart about the vertical support member and pivotally attached to said bracket angle assembly for pivotable movement in an angular arcuate path toward or away from said vertical member to a desired angular position with respect to said vertical support member; and
   d. a plurality of bracing support members, having a substantially rectangular cross-sectional configuration, and having an upper end mounted within said sleeve means for adjustable movement to a desired angular position with respect to said vertical support member, for further maintaining said vertical members in a stable vertical position in spite of the contour of the underlying terrain.

2. The adapter system of claim 1, wherein said system is held in contact with the underlying terrain by retainer means interlockingly engaging the lower ends of said bracing support members.

3. The adapter system of claim 1, wherein said base stake means includes striker means, located at the top of said support means, for use in driving said support means into the underlying terrain.

4. The adapter system of claim 1, wherein said base support means includes pocket means, forming a substantially rectangular cross-sectional open, inner area, for mounting the lower end of said vertical support member within said pocket means.

5. The adapter system of claim 1 wherein said forwardly-extending section and said sidewardly-extending section, respectively, are disposed at substantially right angles one with respect to the other.

6. The adapter system of claim 1, wherein said rearwardly-extending section is disposed at an obtuse angle with respect to said sidewardly-extending and said forwardly-extending sections, respectively.

7. The adapter system of claim 1, wherein said vertical support member is secured into said underlying terrain by a base support means comprising stake means having a pointed end to assist in driving said base support means into said underlying terrain.

8. The adapter system of claim 7, wherein a striker means is provided at the top of said stake means for use in driving said base support means into said ground.

9. A method for maintaining and supporting a temporary electrical service in position above ground level at a building site prior to installation of permanent electrical service, which comprises:
   a. securing a vertical support member into the underlying terrain in a substantially vertical position;
   b. connecting a bracket support means including a bracket angle assembly comprising a pair of front bracket angle means and a rear bracket angle means to said vertical support member, said bracket support being movable along said vertical support member in an upward and downward substantially vertical direction to a desired vertical position, and including a plurality of spaced-apart sleeve means pivotally connected at one end to said bracket angle assembly for adjustable movement in an angular arcuate path toward or away from said vertical member to a desired angular position with respect to said vertical support member;
   c. mounting bracing support members within each of said sleeve means;
   d. adjustably moving said bracket support means along said vertical support member in an upward or downward vertical direction to a desired vertical height;
   e. adjustably moving said bracing support members to the desired angular position with respect to said vertical support member, so that the lower ends of said bracing support members are in engagement with the underlying terrain regardless of its contour; and
   f. clamping said bracket support means onto said vertical support member so that said temporary electrical service and securing said vertical support member into said underlying terrain by driving a base support means into said terrain, and then positioning said vertical support member within said base support means.

10. The method of claim 9, wherein said sleeve means comprises front wall sections, sidewall sections, and rear wall sections, respectively, joined one to the other to form a substantially rectangular cross-sectional open inner area.

11. The method of claim 9, wherein said bracket angle assembly interlockingly connects said vertical support member for adjustably moving said bracket support means along said support member.

12. The method of claim 9, wherein said base support means includes pocket means, forming a substantially rectangular cross-sectional open, inner area, for mounting said vertical support member within said pocket means.

* * * * *

UNITED STATES PATENT AND TRADEMARK OFFICE
CERTIFICATE OF CORRECTION

PATENT NO. : 4,712,762
DATED : December 15, 1987
INVENTOR(S) : William O. Liedle It is certified that error appears in the above-identified patent and that said Letters Patent is hereby corrected as shown below:

Col 5, line 68 replace "stake" with --support--;

Col 6, line 1 replace "support" in both instances with --stake--;

Col 6, line 57 after "service" insert --is maintained in a uniform stable substantially vertical position in spite of the contour of the underlying terrain--.

Signed and Sealed this

Twentieth Day of September, 1988

*Attest:*

DONALD J. QUIGG

*Attesting Officer*  *Commissioner of Patents and Trademarks*